(12) United States Patent
Proksa

(10) Patent No.: US 7,924,968 B2
(45) Date of Patent: Apr. 12, 2011

(54) IMAGING SYSTEM FOR IMAGING A REGION OF INTEREST FROM ENERGY-DEPENDENT PROJECTION DATA

(75) Inventor: Roland Proksa, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 12/596,751

(22) PCT Filed: Apr. 17, 2008

(86) PCT No.: PCT/IB2008/051471
§ 371 (c)(1),
(2), (4) Date: Oct. 20, 2009

(87) PCT Pub. No.: WO2008/129474
PCT Pub. Date: Oct. 30, 2008

(65) Prior Publication Data
US 2010/0091946 A1    Apr. 15, 2010

(30) Foreign Application Priority Data
Apr. 23, 2007    (EP) .................................... 07106729

(51) Int. Cl.
*A61B 6/00*    (2006.01)
(52) U.S. Cl. ................................................ 378/4; 378/5
(58) Field of Classification Search .............. 378/4, 5, 378/62
See application file for complete search history.

(56) References Cited

U.S. PATENT DOCUMENTS

| 4,029,963 | A  | * | 6/1977  | Alvarez et al. ................... 378/5 |
| 6,035,012 | A  | * | 3/2000  | Hsieh ................................. 378/4 |
| 6,507,633 | B1 | * | 1/2003  | Elbakri et al. .................... 378/8 |
| 6,614,874 | B2 | * | 9/2003  | Avinash ........................... 378/62 |
| 6,661,873 | B2 | * | 12/2003 | Jabri et al. ................. 378/98.11 |
| 6,683,934 | B1 | * | 1/2004  | Zhao et al. ....................... 378/9 |
| 6,754,298 | B2 | * | 6/2004  | Fessler .............................. 378/4 |
| 7,822,169 | B2 | * | 10/2010 | Roessl et al. ..................... 378/5 |
| 7,889,834 | B2 | * | 2/2011  | Heismann ......................... 378/4 |

FOREIGN PATENT DOCUMENTS

WO    02067201 A1    8/2002

OTHER PUBLICATIONS

Elbakri, I. A., et al.; Statistical Image Reconstruction for Polyenergetic X-ray Computed Tomography; 2002; IEEE Trans. on Medical Imaging; 21(2)89-99.
Llopart, X., et al.; Medipix2: a 64-k Pixel Readout Chip with 55-um Square Elements Working in Single Photon Counting Mode; 2002; IEEE Trans. on Nuclear Science; 49(5)2279-2283.
Llopart, X., et al.; First test measurements of 64k pixel readout chip working in single photon counting mode; 2003; Nuclear Instruments and Methods in Physics Research; a509; 157-163.

* cited by examiner

*Primary Examiner* — Edward J Glick
*Assistant Examiner* — Alexander H Taningco

(57) ABSTRACT

The invention relates to an imaging system for imaging a region of interest from energy-dependent projection data, wherein the imaging system comprises a projection data providing unit (1, 2, 3, 6, 7, 8) for providing energy-dependent first projection data of the region of interest. The imaging system comprises further an attenuation component image generation unit (12) for generating attenuation component images of the region of interest by generating energy-dependent second projection data using a model in which the projection data depend on attenuation component images. The component image generation unit (12) is adapted for generating the attenuation component images such that deviations of the second projection data from the first projection data are reduced.

20 Claims, 3 Drawing Sheets

IMAGING SYSTEM FOR IMAGING A REGION OF INTEREST FROM ENERGY-DEPENDENT PROJECTION DATA

FIELD OF THE INVENTION

The invention relates to an imaging system, an imaging method and a computer program for imaging a region of interest from energy-dependent projection data.

BACKGROUND OF THE INVENTION

U.S. Pat. No. 6,507,633 B1 discloses a computed tomography system, which reconstructs an initial image of a region of interest from measured energy-dependent projection data. The initial image is segmented into several segments, wherein each segment represents another kind of material. For example, one segment can represent bones and another segment can represent soft tissue of a patient. A model for generating calculated energy-dependent projection data is used, which takes the different absorption distributions of the different kind of materials in the different segments into account, and deviations of the calculated energy-dependent projection data from the measured-projection data are minimized by modifying the different absorption distributions of the different kinds of materials in the different segments resulting in an image of the region of interest.

This reconstruction of an image of a region of interest is based on an initial segmentation. A segmentation of a computed tomography images is often inaccurate, in particular, if parts of an object have to be segmented which have almost the same image values leading to artifacts in the finally reconstructed image. In addition, a segmentation of an initial image is very time consuming.

SUMMARY OF THE INVENTION

It is an object of the present invention to provide an imaging system for imaging a region of interest from energy-dependent projection data wherein artifacts in a reconstructed image of the region of interest are reduced. It is a further object of the present invention to provide a corresponding imaging method and a corresponding computer program for imaging a region of interest from energy-dependent projection data.

In an aspect of the present invention an imaging system for imaging a region of interest from energy-dependent projection data is provided, which comprises a projection data providing unit for providing energy-dependent first projection data of the region of interest and an attenuation component image generation unit for generating attenuation component images of the region of interest by generating energy-dependent second projection data using a model in which the projection data depend on attenuation component images, wherein the attenuation component image generation unit is adapted for generating the attenuation component images such that deviations of the second projection data from the first projection data are reduced.

The invention is based on the idea that not only one image of the region of interest is reconstructed, but several images being attenuation component images. An attenuation component image is an image having image elements caused by a certain attenuation effect. These attenuation effects can be an absorption of a certain material within the region of interest. For example, one attenuation component image can be an image caused by the absorption of a certain material and another attenuation component image can be an image caused by the absorption of another material. Alternatively or in addition, an attenuation component image can be caused by only one or several different physical effects. For example, one attenuation component image can be an image caused by the Compton effect and another attenuation component image can be an image caused by the photo-electric effect. Since, according to the invention, each attenuation component image is an image of the region of interest, wherein each attenuation component image represents a certain attenuation effect, an initial segmentation of an image of the region of interest is not required, thereby reducing artifacts within the reconstructed image and eliminating the computational costs for an initial segmentation.

The imaging system is preferentially a computed tomography system, wherein the projection data providing unit is preferentially a combination of a radiation source for emitting radiation traversing the region of interest, in particular for emitting polychromatic radiation, a detection unit for detecting energy-dependent first projection data, which depend on the radiation after having traversed the region of interest, and a moving unit, which moves the radiation source and the detection unit relative to the region of interest. The moving unit can comprise a rotational gantry on which the radiation source and the detection unit are mounted and preferentially a table or a belt being moveable parallel to the rotational axis of the gantry. The projection data providing unit can also be a storage unit on which measured or simulated energy-dependent first projection data are stored. Furthermore, the projection data providing unit can be any unit, which is capable of providing energy-dependent projection data. For example, the projection data providing unit can also be a C-arm system or a nuclear imaging system.

It is preferred that the attenuation component image generation unit is adapted such that at least two of the attenuation component images spatially overlap. Two or more attenuation component images can spatially overlap partly, but it is preferred that at least two, in particular, all attenuation component images cover the whole region of interest, i.e. that all attenuation component images overlap completely. If the attenuation component images overlap, different attenuation effects can be considered at the same position, i.e. within the same image element, within the region of interest, i.e. different attenuation effects can be separated at the same position within the region of interest.

In an embodiment, the imaging system further comprises an attenuation component image combination unit for combining attenuation component images resulting in a combined attenuation component image. By combining attenuation component images a larger signal-to-noise ratio can be achieved.

It is further preferred that the attenuation component image generation unit is adapted for generating the attenuation component images such that deviations of the second projection data from the first projection data are reduced by generating the attenuation component images such that the likelihood of the first projection data given the attenuation component images is maximized. Since the second projection data depend on the attenuation component images, deviations of the second projection data from the first projection data can be effectively minimized by maximizing the likelihood of the attenuation component images given the first projection data, resulting in a further reduction of artifacts in the attenuation component images of the region of interest.

In a preferred embodiment, the projection data providing unit is adapted for providing energy-dependent first projection data comprising projection data values in energy windows, wherein the attenuation component image generation unit is adapted for determining for each projection data value of the first projection data in each energy window a likelihood of the first projection data value given the respective data value of the second projection data and for generating the attenuation component images such that the product of the likelihoods determined for each projection data value of the first projection data in each energy window is maximized. The use of this likelihood allows determining the attenuation component images in an uncomplicated way, wherein the artifacts in the resulting attenuation component images are further reduced.

It is further preferred that the attenuation component image generation unit is adapted for determining the likelihood of the first projection data given the attenuation component images and a noise model. Since the likelihood considers not only the first projection data, but also a noise model, the quality of the reconstructed attenuation component images will be further improved. The noise model depends on the noise present in the first projection data. Preferentially, the noise model is a Poisson model. It is further preferred that the noise model is a Poisson model, wherein the second projection data are the mean.

In a further aspect of the present invention a determination device for determining attenuation component images of a region of interest from provided energy-dependent first projection data is provided, comprising an attenuation component image generation unit for generating attenuation component images of the region of interest by generating energy-dependent second projection data using a model in which the projection data depend on attenuation component images, wherein the attenuation component image generation unit is adapted for generating the attenuation component images such that deviations of the second projection data from the first projection data are reduced.

In a further aspect of the invention a imaging method for imaging a region of interest from energy-dependent projection data is provided, wherein the imaging method comprises the step of providing energy-dependent first projection data of the region of interest and wherein the imaging method comprises the step of generating attenuation component images of the region of interest by generating energy-dependent second projection data using a model in which the projection data depend on attenuation component images, wherein the attenuation component images are generated such that deviations of the second projection data from the first projection data are reduced.

In a further aspect of the further invention, a determination method for determining attenuation component images of a region of interest from provided energy-dependent first projection data is provided, comprising the step of generating attenuation component images of the region of interest by generating energy-dependent second projection data using a model in which the projection data depend on attenuation component images, wherein the attenuation component images are generated such that deviations of the second projection data from the first projection data are reduced.

In a further aspect of the invention a computer program for imaging a region of interest from energy-dependent projection data is provided, wherein the computer program comprises program code means for causing an imaging system to carry out a method, when the computer program is run on a computer controlling the imaging system.

In a further aspect of the invention a computer program for determining attenuation component images of a region of interest from energy-dependent projection data is provided, wherein the computer program comprises program code means for causing a determination device to carry out a method, when the computer program is run on a computer controlling the determination device.

It shall be understood that the imaging system described herein, the determination device described herein, the determination method described herein, the imaging method described herein, the computer program described herein and the computer program described herein have similar and/or identical preferred embodiments as defined herein.

It shall be understood that preferred embodiments of the invention can also be any combination of the dependent claims with the respective independent claims.

BRIEF DESCRIPTION OF THE DRAWINGS

These and other aspects of the invention will be apparent from and elucidated with reference to the embodiments described hereinafter. In the following drawings

DETAILED DESCRIPTION OF THE EMBODIMENTS

Figure 1:
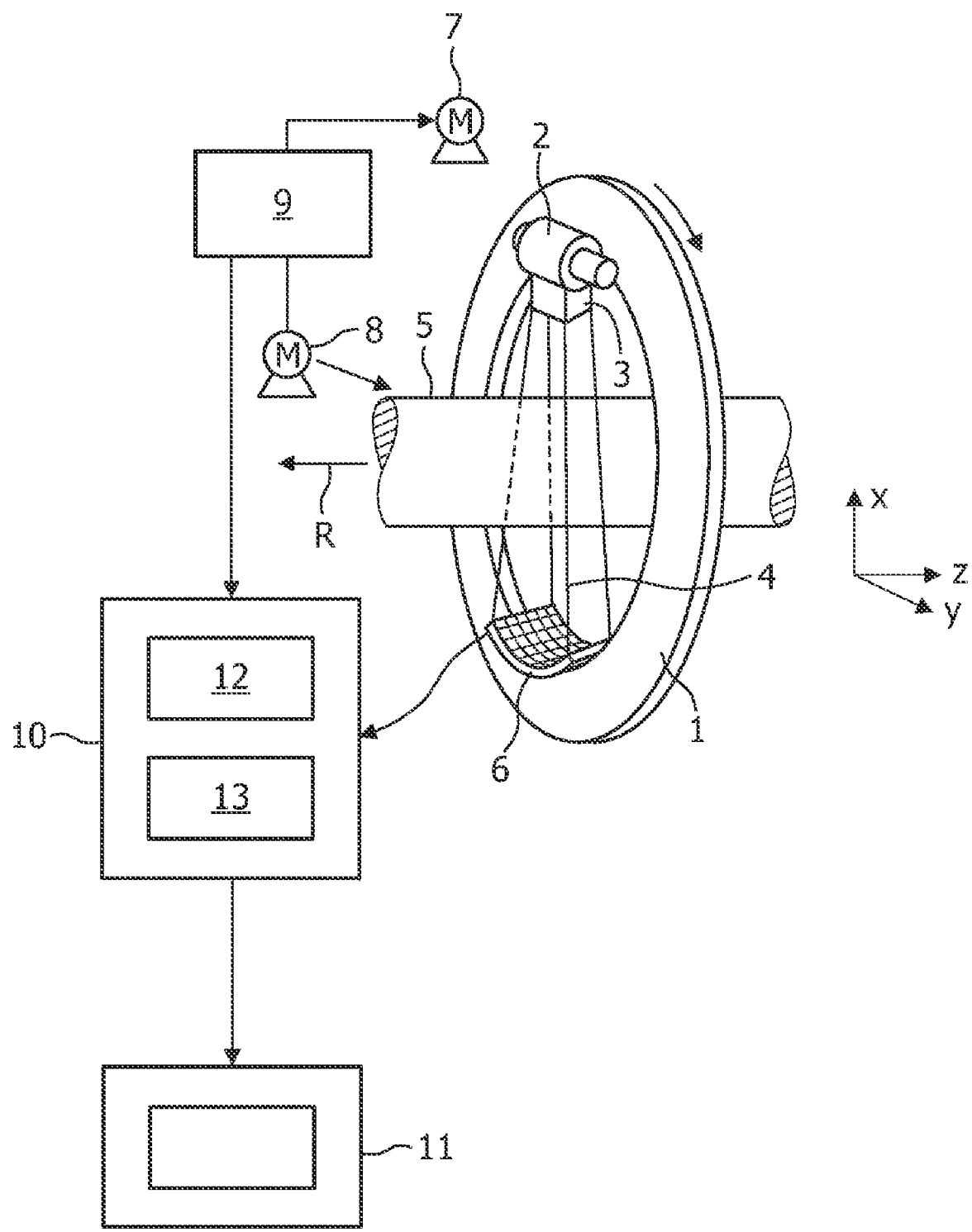
FIG. 1 shows schematically a representation of an imaging system for imaging a region of interest in accordance with the invention.

The imaging system for imaging a region of interest from energy-dependent projection data shown in FIG. 1 is, in this embodiment, a computed tomography system. The computed tomography system includes a gantry 1 which is capable of rotating around an axis of rotation R, which extends parallel to the z-direction. A radiation source 2, for example an X-ray tube, is mounted on the gantry 1. In this embodiment, the radiation source 2 emits polychromatic radiation. The radiation source 2 is provided with a collimator device 3 which forms a conical radiation beam 4 from the radiation emitted by the radiation source 2. In other embodiments, the collimator device 3 can be adapted for forming a radiation beam having another shape, for example, having a fan shape.

The radiation traverses an object (not shown), such as a patient or a technical object, in a region of interest in a cylindrical examination zone 5. After having traversed the region of interest, the radiation beam 4 is incident on an energy-resolving detection unit 6, having in this embodiment a two-dimensional detection surface, which is mounted on the gantry 1. In another embodiment, the energy-resolving detection unit can comprise a one-dimensional detection surface.

Energy-resolving detection units work, for example, on the principle of counting the incident photons and output a signal that shows the number of photons in different energy windows. Such an energy-resolving detection unit is, for instance, described in Llopart, X., et al. "First test measurements of a 64 k pixel readout chip working in a single photon counting mode", Nucl. Inst. and Meth. A, 509 (1-3): 157-163, 2003 and in Llopart, X., et al., "Medipix2: A 64-k pixel readout chip with 55 μm square elements working in a single photon counting mode", IEEE Trans. Nucl. Sci. 49 (5): 2279-2283, 2002. Preferably, the energy-resolving detection unit is adapted such that it provides at least two energy-resolved detection signals for at least three different energy windows.

However, it is favorable to have an even higher energy resolution in order to enhance the sensitivity and noise robustness of the imaging system.

The gantry 1 is driven at a preferably constant but adjustable angular speed by a motor 7. A further motor 8 is provided for displacing the object, for example, a patient who is arranged on a patient table in the examination zone 5, parallel to the direction of the axis of rotation R or the z axis. These motors 7, 8 are controlled by a control unit 9, for instance, such that the radiation source 2 and the examination zone 5, in particular, the region of interest, move relative to each other along a helical trajectory. It is also possible, that the object or the examination zone 5, in particular the region of interest, is not moved and that the X-ray source 2 is rotated, i.e. that the X-ray source 2 travels along a circular trajectory relative to the region of interest.

The data acquired by the detection unit 6 are energy-dependent first projection data. The energy-dependent first projection data are provided to a determination device 10 for determining attenuation component images and/or combined attenuation component images of a region of interest from the provided energy-dependent first projection data. Also the determination device 10 is preferentially controlled by the control unit 9.

One or several attenuation component images and/or one or several combined attenuation component images are provided to a display unit 11 for displaying the images.

The radiation source 2, the detection unit 6, the gantry 1, the patient table and the motors 7, 8 form a projection data providing unit for providing energy-dependent first projection data. In this embodiment, the radiation source 2 emits polychromatic radiation and the detection unit 6 detects the energy-dependent first projection data energy-resolved. Thus, in this embodiment projection data of different energies can be measured simultaneously. But, in other embodiments, another projection data providing unit can be used as long as the projection data providing unit provides energy-dependent projection data of the region of interest. For example, two or more measurements with different radiation spectra and a non-energy-resolving detection unit can be used for providing energy-dependent projection data. Different radiation spectra can, for example, be obtained by using at least two radiation sources having different radiation spectra and/or by using an X-ray tube with different tube voltages and/or by using different filters between the region of interest and the radiation source. If a non-energy-resolving detection unit is used, projection data corresponding to different radiation spectra have to be measured sequentially.

Figure 2:
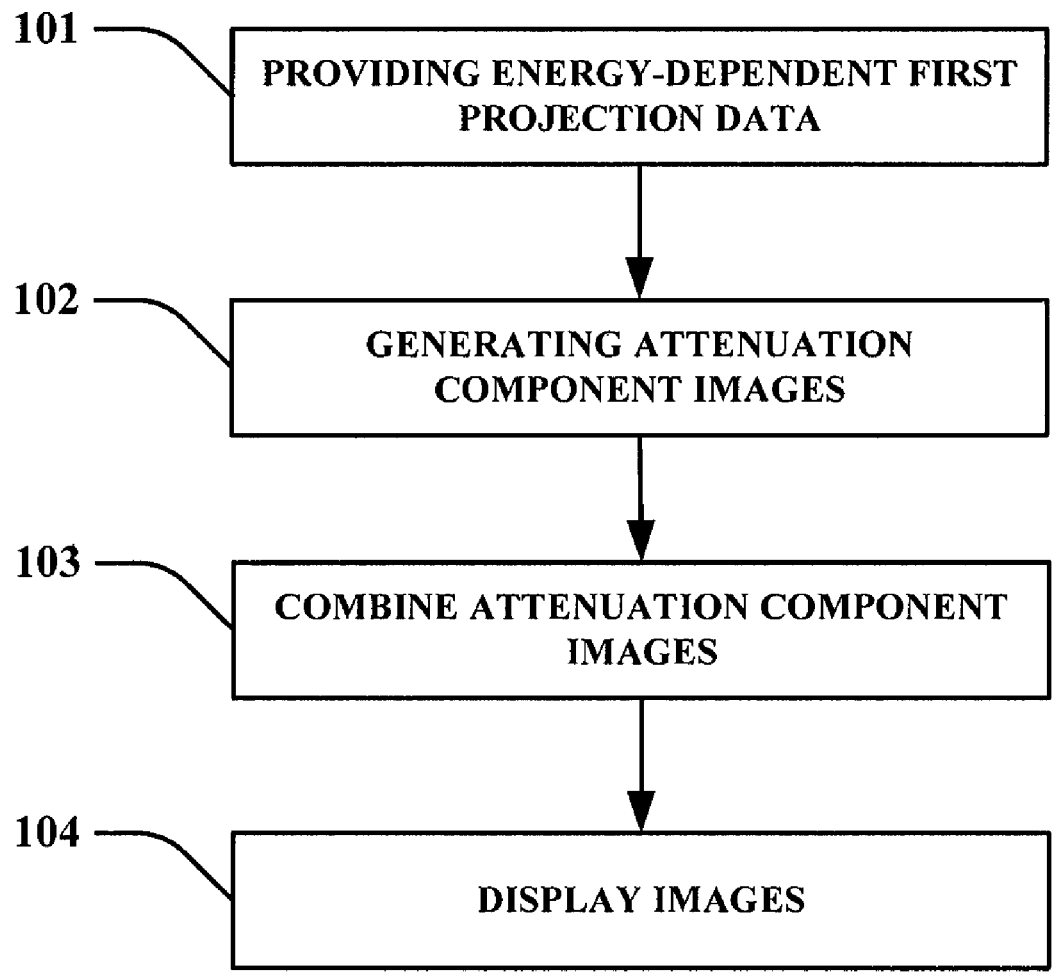
FIG. 2 shows a flow chart illustrating an imaging method for imaging a region of interest in accordance with the invention.

In the following an embodiment of an imaging method for imaging a region of interest from energy-dependent projection data in accordance with the invention will described in more detail with reference to a flowchart shown in FIG. 2.

In step 101 energy-dependent first projection data are provided. The radiation source 2 rotates around the rotational axis R or the z-direction, and the region of interest is not moved, i.e. the radiation source 2 travels along a circular trajectory around the region of interest. In another embodiment, the radiation source 2 can move along another trajectory, for example a helical trajectory relative to the region of interest. The radiation source 2 emits polychromatic radiation traversing the region of interest. The radiation, which has traversed the region of interest, is detected by the detection unit 6, which generates energy-dependent first projection data.

The energy-dependent first projection data are transmitted to the attenuation component image generation unit 12, which generates attenuation component images of the region of interest in step 102. This generation is performed by generating energy-dependent second projection data using a model in which the projection data depend on attenuation component images, wherein the attenuation component image generation unit 12 is adapted for modifying the attenuation component images such that deviations of the second projection data from the first projection data are reduced.

The model, in which the projection data depend on the attenuation component images, can be described by following equation:

$$l_{t,\lambda} = \int S_t(E) e^{-\sum_{n=1}^{N} \int A_n(E) Q_n(\vec{x}) ds} dE. \tag{1}$$

In equation (1), $l_{t,\lambda}$ denotes a data value of the energy-dependent second projection data in the energy window t and the ray direction $\lambda$. The variable t counts the different energy windows, i.e. e.g. if the detection unit 6 provides three energy windows, t has the values 1, 2 and 3. The variable $\lambda$ indicates the different ray directions from the different radiation source positions to the different positions of detection pixels on the detecting surface of the detection unit 6.

The function $S_t(E)$ denotes the energy-dependence of the imaging system without the energy-dependence of an object in the region of interest. Thus, in this embodiment, the function $S_t(E)$ is a product of the spectrum of the radiation incident on the region of interest, in particular of the radiation source, and the spectral sensitivity of the energy window indicated by t of the detection unit. The function $A_n(E)$ is the energy dependence of the attenuation effect, which causes the attenuation component image $Q_n(\vec{x})$.

Figure 3:
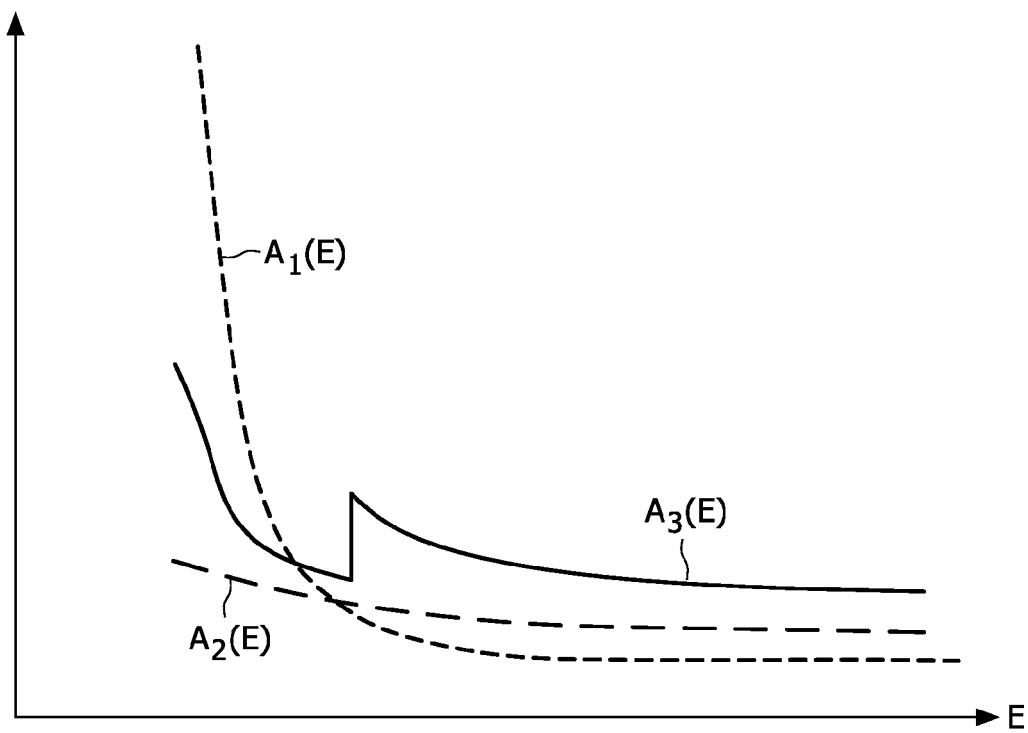
FIG. 3 shows schematically and exemplarily spectra of attenuation effects and FIG. 4 shows schematically and exemplarily the likelihood of a first projection data value given a second projection data value and a noise model.

FIG. 3 shows schematically and exemplarily energy-dependencies of a photo-electric effect $A_1(E)$, the Compton effect $A_2(E)$ and K-edge $A_3(E)$ of a substance like a contrast agent which might be present in the region of interest.

The value N denotes the number of attenuation effects, which are considered in the model. For example, if the photo-electric effect, the Compton effect and the K-edge of a substance like a contrast agent, which might be present in the region of interest, are considered, N is 3. The integration variable E denotes the energy, and the integration with the integration variable s is an integration along the respective ray.

The modification of the attenuation component images such that deviations of the second projection data from the first projection data are reduced are preferentially performed by modifying the attenuation component images and therefore also the energy dependent second projection data such that the likelihood of the energy-dependent first projection data given the attenuation component images and thus the energy-dependent second projection data is maximized. This is preferentially performed by determining for each projection data value of the energy-dependent first projection data in each energy window a likelihood of the projection data value given the respective projection data value of the second projection data and thus given the respective attenuation component images and by modifying the attenuation component images and therefore the energy-dependent second projection data such that the product of the likelihoods determined for each projection data value of the first projection data in each energy window is maximized.

The likelihood $L_{t,\lambda}$ of a projection data value indicated by t and $\lambda$ of the energy-dependent second projection data can be defined by following equation:

$$L_{t,\lambda} = N(m_{t,\lambda}, l_{t,\lambda}). \tag{2}$$

Figure 4:
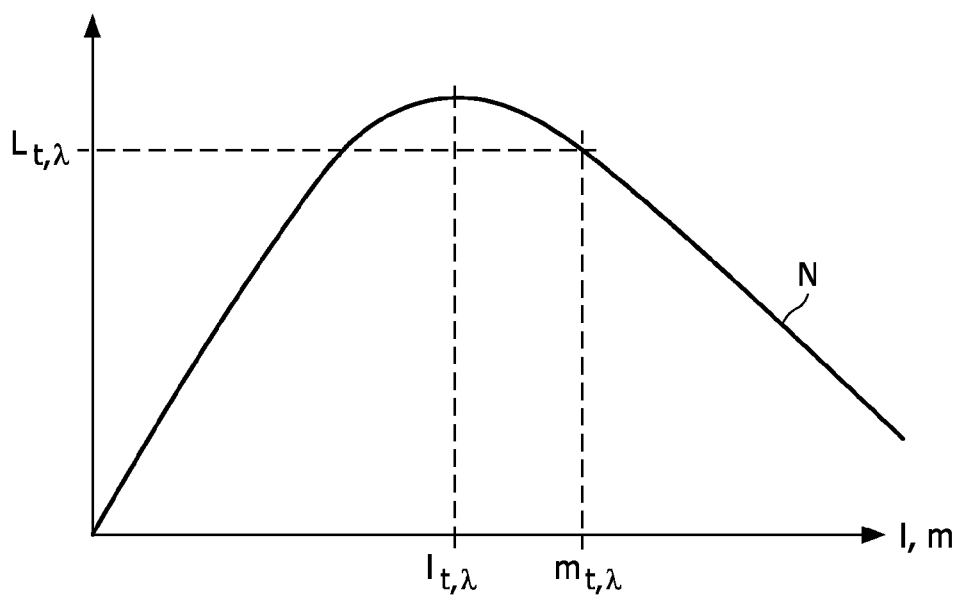

In equation (2), $m_{t,\lambda}$ denotes a projection data value of the energy-dependent first projection data, and $N(m_{t,\lambda},l_{t,\lambda})$ defines the likelihood of the projection data value $m_{t,\lambda}$ of the energy-dependent first projection data, given the projection data value $l_{t,\lambda}$ of the energy-dependent second projection data. The likelihood $N(m_{t,\lambda},l_{t,\lambda})$ considers also the noise of the energy-dependent first projection data, in particular a Poisson model preferentially with $l_{t,\lambda}$ being the mean. The likelihood $N(m_{t,\lambda},l_{t,\lambda})$ is schematically and exemplarily shown in FIG. 4. In particular, FIG. 4 shows schematically and exemplarity the likelihood $L_{t,\lambda}$ for a first projection data value $m_{t,\lambda}$, given a second projection data value $l_{t,\lambda}$ and a noise model N.

The product of the likelihoods determined for each projection data value in each energy window can be defined by following equation:

$$L = \prod_{t \in T, \lambda \in \Lambda} L_{t,\lambda}. \quad (3)$$

In equation (3), T denotes the set of energy windows and $\Lambda$ denotes the set of ray directions, in which projection data values of the energy-dependent first projection data have been measured.

The total likelihood defined in equation (3) is maximized by varying the attenuation component images $Q_n(\vec{x})$ and thus the energy-dependent second projection data $l_{t,\lambda}$ resulting in attenuation component images $Q_n(\vec{x})$. The total likelihood function defined in equation (3) can be maximized by known numerical methods.

The determined attenuation component images are transmitted to the attenuation component image combination unit 13 which combines attenuation component images resulting in a combined attenuation image in step 103. In step 104 the combined attenuation component image and/or one or several of the attenuation component images generated in 102 are displayed on the display 11.

In other embodiments, the imaging system can be an imaging system without an attenuation component image combination unit 13 and 103 can be omitted. In this case, one or several of the attenuation component images generated in step 102 are displayed on the display 11.

In the above described embodiment, energy-dependent first projection data of different energy windows are measured simultaneously. But, the generation of attenuation component images in accordance with the invention can also be performed, if the energy-dependent first projection data of different energies are measured sequentially. Thus, even if, for example, energy-dependent first projection data are provided by acquiring projection data sequentially with one or multiple X-ray tubes running at different voltages and/or having different beam filtrations, i.e. even if due to unwanted movements of an object like a patient or of parts of the imaging system projection data values of different energies, which should correspond to the same paths through an object in the region of interest, do not correspond to the same paths of an object through the region of interest, the generation of attenuation component images in accordance with the invention can be applied and high quality attenuation component images having less artifacts than images reconstructed with know methods are generated.

As mentioned above, in equation (1), $S_t(E)$ denotes the energy dependence of the projection data providing unit, which is not caused by an object in the region of interest. For example, if a polychromatic radiation source and an energy-resolving detection unit with different energy windows are used, $S_t(E)$ depends on the emission spectrum of the radiation source and the energy sensitivity of the respective energy window, in particular, $S_t(E)$ is the product of the emission spectrum of the radiation source and the energy sensitivity of the respective energy window. If a non-energy-resolving detection unit and one or a multiple of X-ray tubes running at different voltages and/or having different beam filtrations are used, the variable t indicates the different combinations of used tubes, voltages and/or beam filtrations and the function $S_t(E)$ depends on the energy sensitivity of the detection unit and the emission spectrum generated by the respective combination of tubes, tube voltages and/or beam filtrations, in particular $S_t(E)$ comprises the product of the energy sensitivity of the detection unit and the emission spectrum generated by the corresponding combination of tubes, tube voltages and/or beam filtrations.

Although the imaging system is being described above as performing a circular or helical trajectory of a radiation source with respect to a region of interest, the invention is not limited to certain trajectories. The projection data providing unit can be any unit which provides energy-dependent projection data of a region of interest.

Other variations to the disclosed embodiments can be understood and effected by those skilled in the art and practicing the claimed invention from a study of the drawings, the disclosure and the dependent claims. In the claims, the word "comprising" does not exclude other elements or steps, and the indifferent article "a" or "an" does not exclude a plurality.

A single unit may fulfill the function of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An imaging system, comprising:
   a projection data providing unit for providing energy-dependent first projection data of a region of interest; and
   an attenuation component image generation unit to generate a first attenuation component image of the region of interest and a second attenuation component image of the region of interest, where the first attenuation component image and the second attenuation component image are generated by generating energy-dependent second projection data from the energy-dependent first projection data using a model that extracts a first attenuation data set from the energy-dependent first projection data and that extracts a second attenuation data set from the energy-dependent first projection data, where the energy-dependent second projection data includes the first attenuation data set and the second attenuation data set, and where deviations of the second projection data from the first projection data are minimized.

2. The imaging system as claimed in claim 1, where the first attenuation component image and the second attenuation component image at least partially spatially overlap.

3. The imaging system as claimed in claim 1, wherein the imaging system further comprises an attenuation component image combination unit for combining the first attenuation component image and the second attenuation component image resulting in a combined attenuation component image.

4. The imaging system as claimed in claim 1, wherein the attenuation component image generation unit is to generate the attenuation component images such that deviations of the second projection data from the first projection data are reduced by generating the attenuation component images such that of the first attenuation component image and the second attenuation component image maximally reflect the first projection data.

5. The imaging system as claimed in claim 4, wherein the energy-dependent first projection data comprises projection data values in energy windows, wherein the attenuation component image generation unit determines for each projection data value of the first projection data in each energy window a level of similarity of the projection data value given the respective projection data value of the second projection data and for generating the attenuation component images such that the product of the levels of similarity determined for each projection data value of the first projection data in each energy window is maximized.

6. The imaging system as claimed in claim 4, wherein the attenuation component image generation unit determines a level of similarity between the first projection data and the attenuation component images based, at least in part, on a noise model.

7. A determination device for determining attenuation component images of a region of interest from provided energy-dependent first projection data, comprising:
an attenuation component image generation unit for generating attenuation component images of the region of interest by generating energy-dependent second projection data using a model, wherein the attenuation component image generation unit is adapted for generating the attenuation component images such that deviations of the second projection data from the first projection data are reduced.

8. A determination method for determining attenuation component images of a region of interest from provided energy-dependent first projection data, comprising:
generating attenuation component images of the region of interest by generating energy-dependent second projection data using a model that creates the energy-dependent second projection data from the energy-dependent first projection data, wherein the attenuation component images are generated such that deviations of the second projection data from the first projection data are reduced.

9. A method, comprising:
acquiring a first energy-dependent projection data set of a region of interest;
generating a second energy-dependent projection data set, where the second energy-dependent projection data set is derived from the first energy-dependent projection data set; and
producing at least two attenuation component images from the second energy-dependent projection data set, where similarity between the second energy-dependent projection data set and the first energy-dependent projection data set is maximized.

10. The method of claim 9, comprising:
causing the at least two attenuation component images to display as separate images.

11. The method of claim 9, where the first energy-dependent projection data set is a sum of at least a first attenuation data set based, at least in part, on a first attenuation effect and a second attenuation data set based, at least in part, on a second attenuation effect.

12. The method of claim 11, where the first attenuation effect is a first absorption level of a certain material within the region of interest and where the second attenuation effect is a second absorption level of a certain material within the region of interest.

13. The method of claim 11, where the first attenuation effect is a first physical effect and where the second attenuation effect is a second physical effect.

14. The method of claim 9, where the at least two attenuation component image are configured to be produced without an initial segmentation of an image of the region of interest.

15. The method of claim 9, comprising:
combining at least two attenuation component images into at least one combined attenuation component image; and
causing the at least one combined attenuation component image to be displayed.

16. The method of claim 15, comprising:
modifying the at least one combined attenuation component image such that the second energy-dependent projection data set becomes modified so that the second energy-dependent projection data has minimal derivation from the first energy-dependent projection data set, where the at least one combined attenuation component image is displayed after modification.

17. The method of claim 9, where the second energy-dependent projection data is generated from a mathematical model being applied to the first energy-dependent projection data.

18. The method of claim 17, where the mathematical model includes, at least in part, an integral of at least a function that denotes energy-dependence of an imaging system without energy-dependence of an object in the region of interest and an exponential sum of integrals.

19. The method of claim 9, where the first energy-dependent projection data set is collected from at least a first energy window and a second energy window sequentially.

20. The method of claim 9, where the first energy-dependent projection data set is collected from at least a first energy window and a second energy window simultaneously.

* * * * *